United States Patent [19]

Lagain

[11] Patent Number: 4,726,803
[45] Date of Patent: Feb. 23, 1988

[54] BOTTOM SEAL BAG MAKING MACHINE

[75] Inventor: Georges Lagain, Enghein-les-Bains, France

[73] Assignee: FMC Corporation, Chicago, Ill.

[21] Appl. No.: 941,879

[22] Filed: Dec. 15, 1986

[30] Foreign Application Priority Data

Jan. 2, 1986 [FR] France .................... 86 00027

[51] Int. Cl.⁴ .............................................. B31B 1/64
[52] U.S. Cl. ................................ 493/204; 493/194; 493/203; 156/515
[58] Field of Search ............... 493/194, 199, 203, 206, 493/207, 209, 204, 195, 196, 202; 156/515

[56] References Cited

U.S. PATENT DOCUMENTS

| | | | |
|---|---|---|---|
| 3,810,420 | 5/1974 | Ravel | 493/204 |
| 4,149,918 | 4/1979 | Cislak | 156/515 |
| 4,230,029 | 10/1980 | Schott, Jr. | 493/195 |
| 4,396,379 | 8/1983 | White et al. | 493/204 |
| 4,490,207 | 12/1984 | Achelpohl | 493/203 |
| 4,518,378 | 5/1985 | Schulze et al. | 493/194 |

FOREIGN PATENT DOCUMENTS

| | | |
|---|---|---|
| 900020 | 6/1984 | Belgium . |
| 0090352 | 10/1983 | European Pat. Off. . |
| 1930841 | 1/1970 | Fed. Rep. of Germany . |
| 3136619 | 3/1983 | Fed. Rep. of Germany . |
| 1139838 | 2/1957 | France . |
| 1290205 | 4/1962 | France . |
| 1388824 | 1/1965 | France . |
| 1485253 | 5/1967 | France . |
| 2031713 | 11/1970 | France . |
| 2261121 | 9/1975 | France . |
| 2566741 | 1/1986 | France . |
| 2026988 | 2/1980 | United Kingdom . |

Primary Examiner—Frederick R. Schmidt
Assistant Examiner—Robert Showalter
Attorney, Agent, or Firm—Raymond E. Parks; Douglas W. Rudy; Richard B. Megley

[57] ABSTRACT

A machine for the manufacture and stacking of bags, pouches and the like made from a thermoplastic material in which the upper welding jaw and a belt driven angled cutting blade are mounted in fixed manner to the machine. The lower welding jaw is mounted for moving vertically and has a downstream projecting holding shoulder which has a transverse groove with stepped edges forming a blade support in the raised position of the lower jaw. A blocking shoe is provided a short downstream distance from the holding shoulder and has a blade spring member attached to a bottom surface which extends in an upstream direction toward the lower welding jaw. The blade spring operates to first tension the thermoplastic segment in the raised position of the lower jaw prior to the cutting by the transverse moving blade and then to deliver and hold the severed end of the formed bag on a resilient pad on the stacking table.

4 Claims, 7 Drawing Figures

BOTTOM SEAL BAG MAKING MACHINE

The present invention relates to an apparatus for the manufacture and the stacking of bags, pouches and the like, made from a tubular web of thermoplastic material. The apparatus is of the type having a guiding path for the flattened thermoplastic tubular web, a pair of intermittently operating upper and lower transporting rollers between which the flattened tubular web is held tight during its intermittent transportation along the guiding path to the apparatus. The lower roller is mounted in a fixed manner to the frame of the machine and the upper roller is movably mounted to the frame so that it can move upwardly away from the lower roller under the action of a first governing member. There are a pair of sealing or welding jaws provided, one of which is placed below and the other one is placed above the trajectory of passage of the tubular web downstream from the transporting rollers. One of the sealing jaws is movable in a direction perpendicular to the trajectory so that it can come close to or move away from the other sealing or welding jaw. There is provided a device for transverse cutting of the tubular web downstream from the sealing or welding jaws which comprises an upper cutting blade and a lower counterblade, as well as a means or device for the intermittent stopping of the tubular web. The stopping device means is provided upstream from the sealing or welding jaws and from the transporting rollers and comprises upper and lower support shoes. The upper support shoe is vertically movable and is acted upon by the first governing member while the lower countershoe is in fixed relation to the upper shoe.

A typical bag making machine is described in French Pat. No. 1,388,824 and it presents, especially, the disadvantages of not permitting high cyclic operation and manufacture of the thermoplastic bags, and of not having any device for the stacking of the bags after they are sealed or welded and the tubular web has been cut to form an individual bag.

In accordance with the present invention there is provided a device for the stacking of bags downstream from the sealing or welding jaws, of the type having a stacking table which is vertically movable relative to the movable lower sealing jaw and is capable of resiliently bearing, at its upper upstream end, against the lower face of a retaining shoulder on the lower jaw, as well as against an upper clamping means or blocking shoe, which is vertically movable and is capable of clamping the end part of the tubular web, which projects from the cutting device, against the stacking table, while being separated by a predetermined distance from the upstream end of the bag which is sealed or welded and cut in the manufacturing process, and below the cutting level of the bag. Once cut, the last bag resting on the stack of bags and the stacking table are lowered under the action of the blocking shoe in order to move the stack away from the retaining shoulder and to enable the rear or upstream end of the cut bag to flatten itself and to position itself on the stack of bags where it will be held as soon as the blocking shoe returns, thus permitting the resilient raising of the table and the tightening of the trailing end of the stack of bags between the table and the retraining shoulder of the lower welding or sealing jaw.

The improvements achieved lately in the field of thermoplastic tubular web extrusion cause those tubular webs to have thinner and thinner walls and, consequently, walls which have less and less memory or elasticity to return to their initial position after they have been partially moved away from it. That phenomenon explains the fact that bags made of such thin tubular webs fold down very slowly or insufficiently toward the stack of bags after their trailing end has been cut. That drawback is not eliminated, in spite of the use of a blowing nozzle carried by the blocking shoe which is intended to blow a sheet of air in the direction of the lower face of the retaining shoulder. There follows that such a type of stacking device for bags, as for example known through German Laid Open Patent Application No. 19 30 841, does not permit the manufacture of thermoplastic bags at a high cyclic rate or speed.

Instead of a sheet of blown air, it is also possible to use an additional application member, as is proposed in European Patent Applications Nos. 0 050 339 and 0 084 880. In both cases, the length of tubular web held between the transporting roller for one part and the stacking table and the blocking shoe for the other part, is put under tension, either through an additional lowering of the table bag stacking blocking shoe assembly shown in European Patent Application No. 0 050 339, (corresponds to U.S. Pat. No. 4,396,379 issued on Aug. 2, 1983), or by means of the application member which is vertically movable and is provided for above the tubular web between the upper cutting blade and the blocking shoe shown in European Patent Application No. 0 084 880 (corresponds to U.S. Pat. No. 4,490,207 issued on Dec. 25, 1984). In both cases, the different elements or members to be set into motion and to be stopped in different precise positions make it necessary to respect cyclic rates which are relatively low and which lead to tension spurts on relatively short lengths of the tubular web, something which may cause uncontrollable lengthening of the bags.

The present invention proposes to provide an apparatus for the manufacturing and the stacking of thermoplastic bags of the aforementioned type, an apparatus which makes it possible to reach very high cyclic rates or speeds of manufacturing, even with thin thermoplastic tubular webs.

In an apparatus of that type, the objective of the invention is reached because:

(1) the upper welding jaw, as well as the upper cutting blade, are mounted in a fixed manner, the upper cutting blade being continuously reciprocated along a close trajectory, the lower side of which is parallel with the plane of the length of tubular web, which is close to and perpendicular to the longitudinal edges of the tubular web;

(2) the lower welding jaw is mounted vertically movable and has a downstream projecting shoulder functioning as a counterblade. The shoulder has an upward open transverse groove which extends in a direction parallel with the lower side of the trajectory of the upper cutting blade which penetrates into the groove when the lower jaw is in a high welding position; and (3) the blocking shoe or second clamping means comprises, at a short distance from its lower face, a blade type spring which extends upstream in direction of the jaws and which comes, by its free upstream end and in an unstretched position, to the immediate vicinity of the vertical plane running through the downstream frontal face of the retaining shoulder of the lower jaw.

By means of that design, the number of members in intermittent displacement and which are to be moved and stopped in a rapid manner, is appreciably decreased.

Other characteristics and advantaes of the invention will be seen in the attached claims and in the description of one mode of execution, given with reference to the figures of the accompanying drawing in which:

With reference to the drawing, the apparatus incorporating the present invention for the manufacturing and the stacking of thermoplastic bags comprises a frame or casing having lateral side plates 1. A thermoplastic tubular web 2 which unwinds from a storage spool (not shown), moves in a flattened state along a guiding path 3 which extends horizontally through the upper part of the bag making machine. On the trajectory of that guiding path there are provided for, from upstream going downstream in the direction of passage of tubular web 2:

A photoelectric cell 4 which is used to detect length markings on the tubular web 2, and to start the activation of a governing device 5 for the intermittent stopping of web 2;

A pair of welding jaws 8, 9 which are used to weld or seal together the two opposite faces of the flattened web 2 along a transverse line and preferably, perpendicular to the longitudinal edges of the flattened web 2;

A cutting device 10 which is used for transverse cutting and of the tubular web 2 downstream from and in the immediate vicinity of the welded seam created by the jaws 8, 9;

A stacking device 11 which is used for stacking the sealed and cut bags, and comprises a stacking table 67; and A conveyor belt 13 which serves for moving the collected stack of bags 14 from the stacking device.

Figure 3:
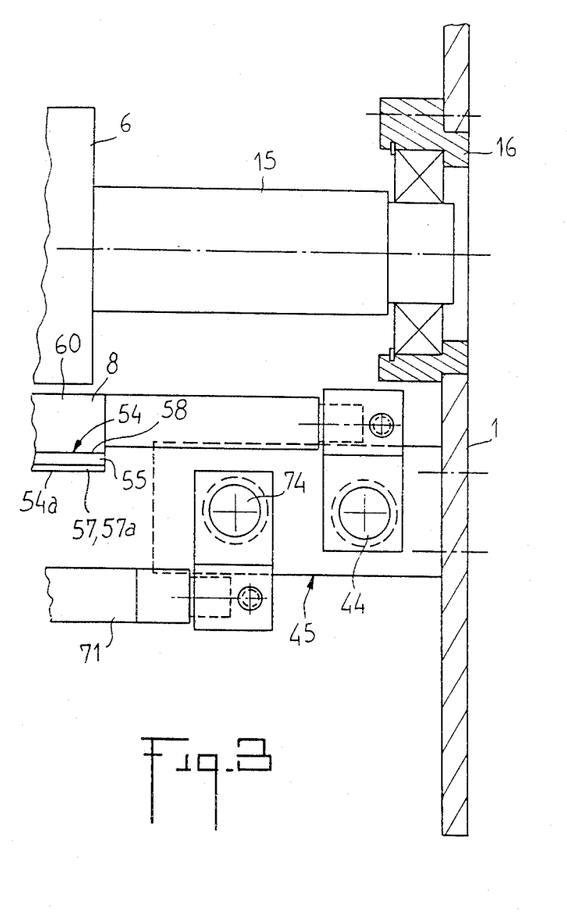
FIG. 3 is a plan view of the front left side of the installation, the upper roller, the upper jaw and the upper cutting blade (not shown)

The lower transporting roller 6 is fastened, such as with a cotter pin, on a driving shaft 15 (FIG. 3), the ends of which are lodged inside bearings 16 affixed to the frame 1. The shaft 15 is connected to a continuous driving motor through a speed variation device (not shown). The lower roller 6 comprises a series of annular grooves 17 which are used to receive and to leave passage for air blowing tubes 18 provided for horizontally at the upper part of the lower roller 6 below the tubular web and which extend up to the vicinity of the rear or upstream face of jaws 8, 9. Those blowing tubes 18 are used to produce a first sheet of air below the tubular web 2, and to prevent the latter from remaining glued to, or sticking to, the lower jaw 8 after sealing the bottom of a bag segment. Furthermore, the first air sheet serves to support and to propel the end of the tubular web 2 beyond jaws 8, 9 and beyond the transverse cutting device 10. The upstream ends of the blowing tubes 18 are carried by an air distributor or manifold 19 affixed to frame 1.

The upper transporting roller 7 is fixed or fastened, such as by a cotter pin, to a support shaft 20 journally mounted at the downstream or front end of two l-shaped double arm rock levers 21 which have the elbow or apex 22 of each mounted in a pivoting manner around an articulation shaft 23 mounted to frame 1. The horizontal arm 21a, of the double arm lever 21, carries the support shaft 20 of the upper roller 7, while the rear vertical arm 21b of the double arm lever 21 extends downward and carries near its lower free end, a small disc or roller 24 which cooperates with a cam 25 and constitutes, for the upper roller 7, a first governing member. The cam 25 is fastened by means, such as a cotter pin, to a governing shaft 26 which is continuously rotating at a constant but adjustable speed and which is mounted on the frame 1.

The lower end of the vertical arm 21b of the double arm lever 21 is connected to a tension spring 27, the other end of which, is connected to the lower end of a simple lever 28, the upper end of which pivots around an articulation pivot shaft 29 mounted to frame 1 and parallel with the articulation shaft 23 of the double arm lever 21 and with the governing shaft 26.

Figure 4:
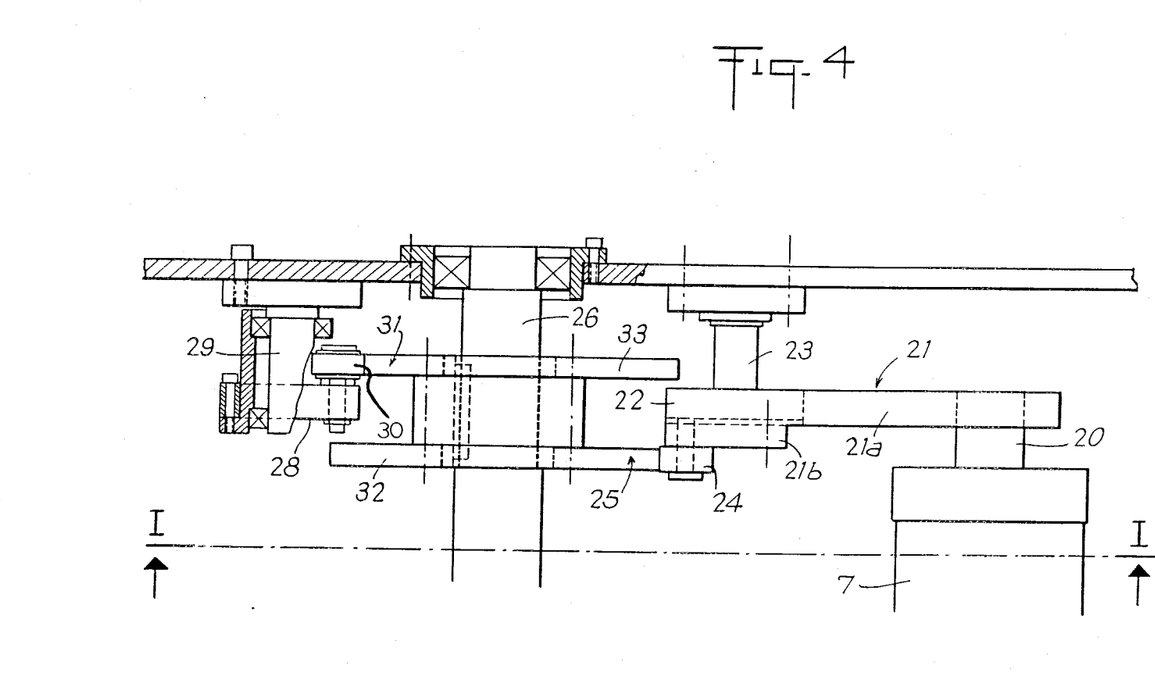
FIG. 4 is a plan view of the cutting blade, median and rear of the apparatus, with removal of certain elements which hinder the view.

Intermediate its ends, the simple lever 28 carries a contact roller or small disc 30 which cooperates with a second cam 31, also fastened by means, such as a cotter pin, to the governing shaft 26 of the first cam 25. Those two cams 25 and 31 have governing surfaces 32, 33 (FIG. 4), which are angularly shifted relative to each other, in a manner such that the simple lever 28 will be urged in a clockwise direction around the pivot axis 29, so as to have a maximum angular clearance at the angular position shown in broken lines in FIG. 1, relative to the rest position shown in a solid line, and to stretch to a maximum the tension spring 27, each time the upper roller 7 must be applied with maximum force against the tubular web 2 and the lower roller 6, at the time of the start of a new transportation step of the tubular web 2, and so that the simple lever 28 will then be able, at the end of a one-step forward motion of web 2, to come back to its rest position in which the tension spring 27 exerts only a minimum force on the double arm lever 21 and, consequently, on the upper roller 7, and so that exactly at the end of the forward motion step of web 2, the first governing cam 25 will cause to pivot slightly, rapidly and without any appreciable stress, the vertical arm 21b of the double arm lever 21 in a clockwise direction for the purpose of moving the upper roller 7 slightly away from the lower roller 6.

The precise timing for the spacing of roller 7 may further be improved in combination with a force variation causing device or means 34 for the application of a force to the roller 7. The force variation causing device or means 34 uses a rapid action member, such as an electro-magnet 35, the coil 35a of which is mounted to frame 1, and the movable iron core 35b of which can act on an adjustable lug piece 36 carried, for example, by the vertical arm 21b of double arm lever 21.

It is obvious that the action of the electro-magnet 35 on the double lever 21, in the direction of a spacing of the upper roller 7, may be started by the photoelectric cell 4 mounted in an adjustable manner on the trajectory of the tubular web 2. The instantaneous spacing action of the upper roller 7 is taken up and immediately sustained by the corresponding governing surface 32 of the first cam 25. It is obvious that the shape of that governing surface 32 of the first cam 25 must be such that upper roller 7 can again come close to the web 2 and to the lower roller 6, and to be applied against them at the beginning of a new forward motion step, and until the end of the step.

In order to be able to ensure the precise stopping of tubular web 2 at the end of each forward motion step, the installation also is fitted with an intermittent stopping device or first clamping means 5 which comprises a simple lever 37, the downstream or frontal end of which is articulated on the articulation shaft 23 of double arm lever 21 and which extends in an approximately horizontal direction upstream. The upstream end of simple lever 37 carries an upper support shoe, such as a braking roller 38 provided for above tubular web 2. A facing lower countershoe 39 is placed below the trajectory of the web 2 and is affixed to frame 1. The braking roller 38 is continuously biased in a counterclockwise direction toward the countershoe 39 by means of a compression spring 40 which bears on one side against the upper face of the simple lever 37 and on the other side, against an adjustable lug piece 41 fixed to frame 1.

In order for the braking roller 38 to be spaced from tubular web 2 and from the countershoe 39, the simple lever 37 of the stopping device 5 is provided with an adjustable screw 42 which comes to bear against a lug rod 43 extending below the fore part of the simple lever 37 and is fixed to the vertical arm 21b of the double arm lever 21. Thus, when the upper transporting roller 7 is spaced and pivoted upwardly, the breaking roller 38 can come immediately and clamp itself against the tubular web 2 and against the countershoe 39 and thus instantly stop any subsequent displacement of the tubular web 2. The degree of clearance for the forward motion of the braking roller 38 spacing, relative to a new application of the upper transporting roller 7, may be adjusted by means of regulating screw 42.

Figure 1:
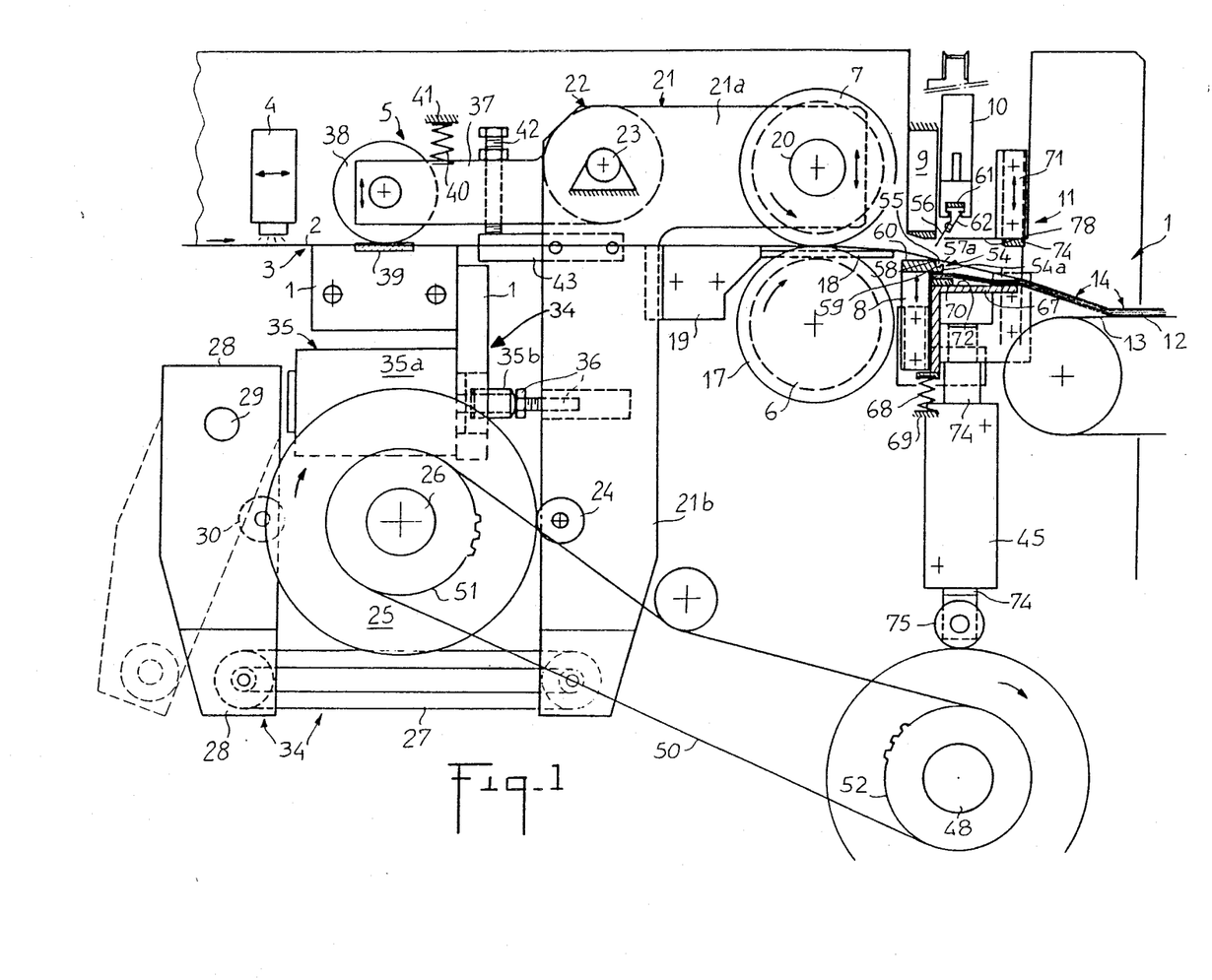
FIG. 1 is a schematic elevated view of a vertical longitudinal section through the apparatus according to the invention, along line I—I in FIGS. 2 and 4.
Figure 2:
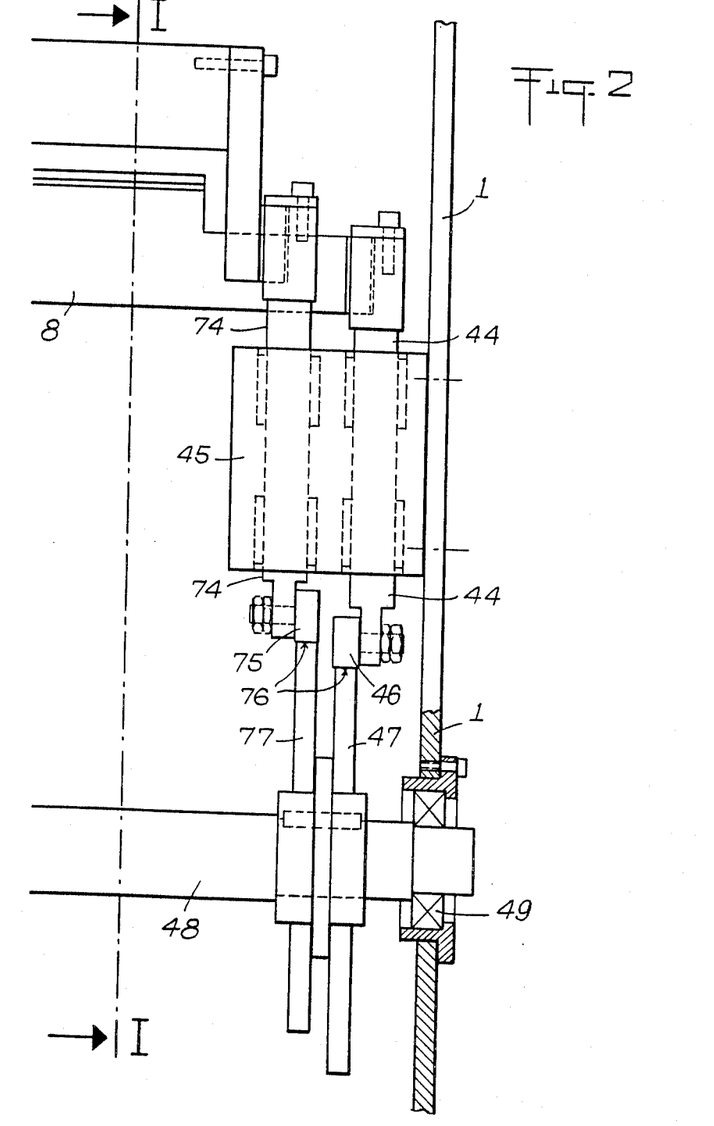
FIG. 2 is a front view of the left side of the installation, taken in the direction of passage of the tubular web.
Figure 5:
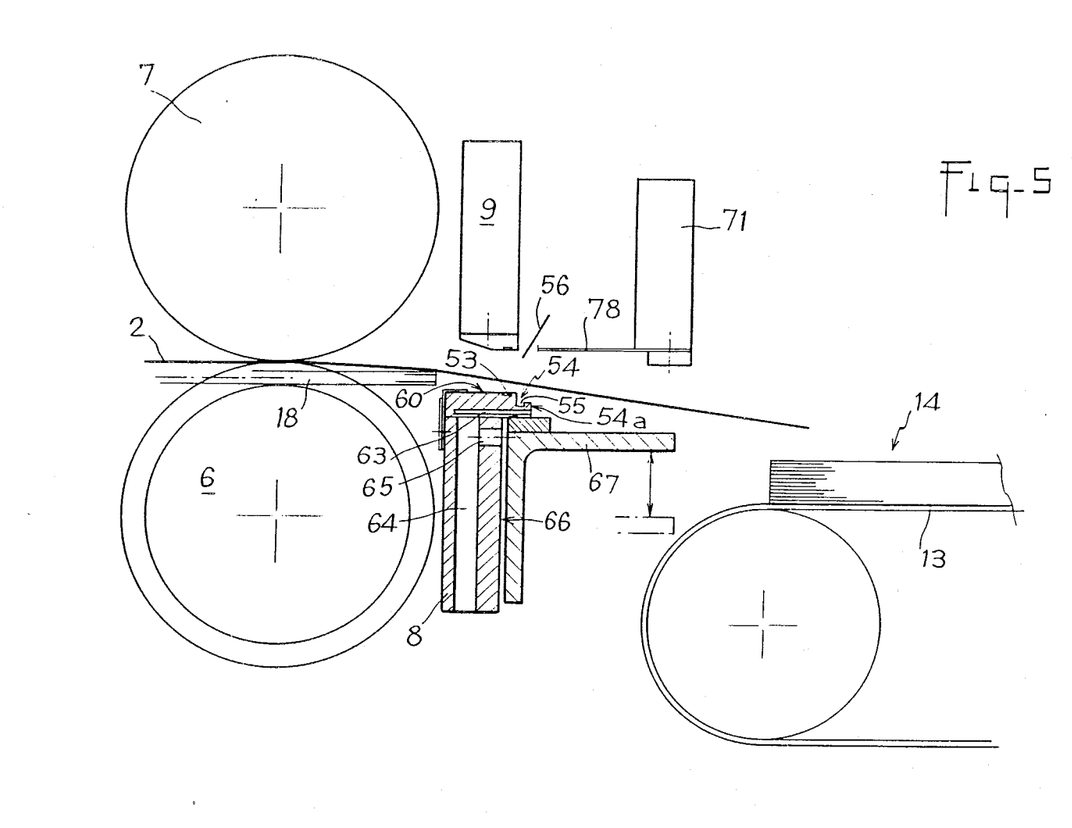
FIGS. 5 to 7 are elevated schematic views of the apparatus illustrating certain essential phases of operation of the bottom seal bag making and stacking machine.
Figure 6:
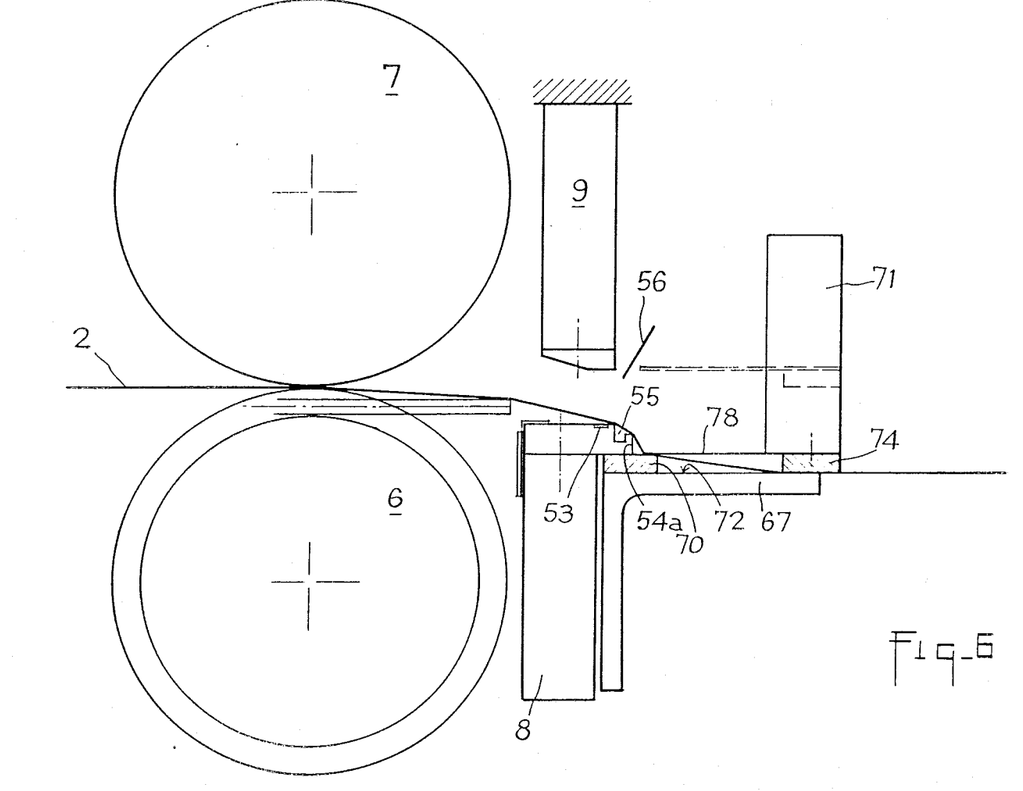

Immedietly downstream from the pair of transporting roller 6, 7, there is provided a pair of welding jaws 8, 9. The lower jaw 8 is vertically movable and the upper jaw 9 is fixed in place to the frame. The vertical raising and lowering displacements of the lower jaw 8 are governed by means of two vertical guiding rods 44 (FIG. 2) fixed at their upper end to the lateral ends of lower jaw 8. Those guiding rods 44 are mounted in a sliding manner inside a guiding casing 45 which is fixed in place to frame 1 and which extends over part of the length of said rods 44 in a manner such as to enable them to perform their maximum run between a high so-called welding position of the lower jaw 8 (FIG. 7), and a low position of said jaw 8 (FIGS. 1, 5 and 6).

At their lower end, the governing rods 44 carry on each one of them, a contact roller or small disc 46 which bears against the governing face of a third cam 47 fastened by means, such as of a cotter pin, to a driven shaft 48 which is mounted by means of bearings 49 on frame 1 and which (FIG. 1), receives its continuous rotation motion from governing shaft 26 through a power transmission chain belt 50 and sprocket gear wheels 51, 52, one of which is fastened, such as by a cotter pin, to shaft 26 and the other to the driven shaft 49.

At its upper part and downstream from its welding line or zone 53, (FIG. 5) the lower jaw 8 presents a projecting retaining shoulder 54 directly downstream and comprising a horizontal transverse groove 55 which extends perpendicularly to the longitudinal edges of the tubular web 2 and in a direction parallel with the horizontal cutting trajectory of the upper cutting blade 56 of a cutting device means 10. The transverse groove 55 acts as a counterblade for the cutting blade 56 which can enter into the groove 55 from one end of same, and by rapidly running through the groove, to cut the tubular web 2.

Figure 7:
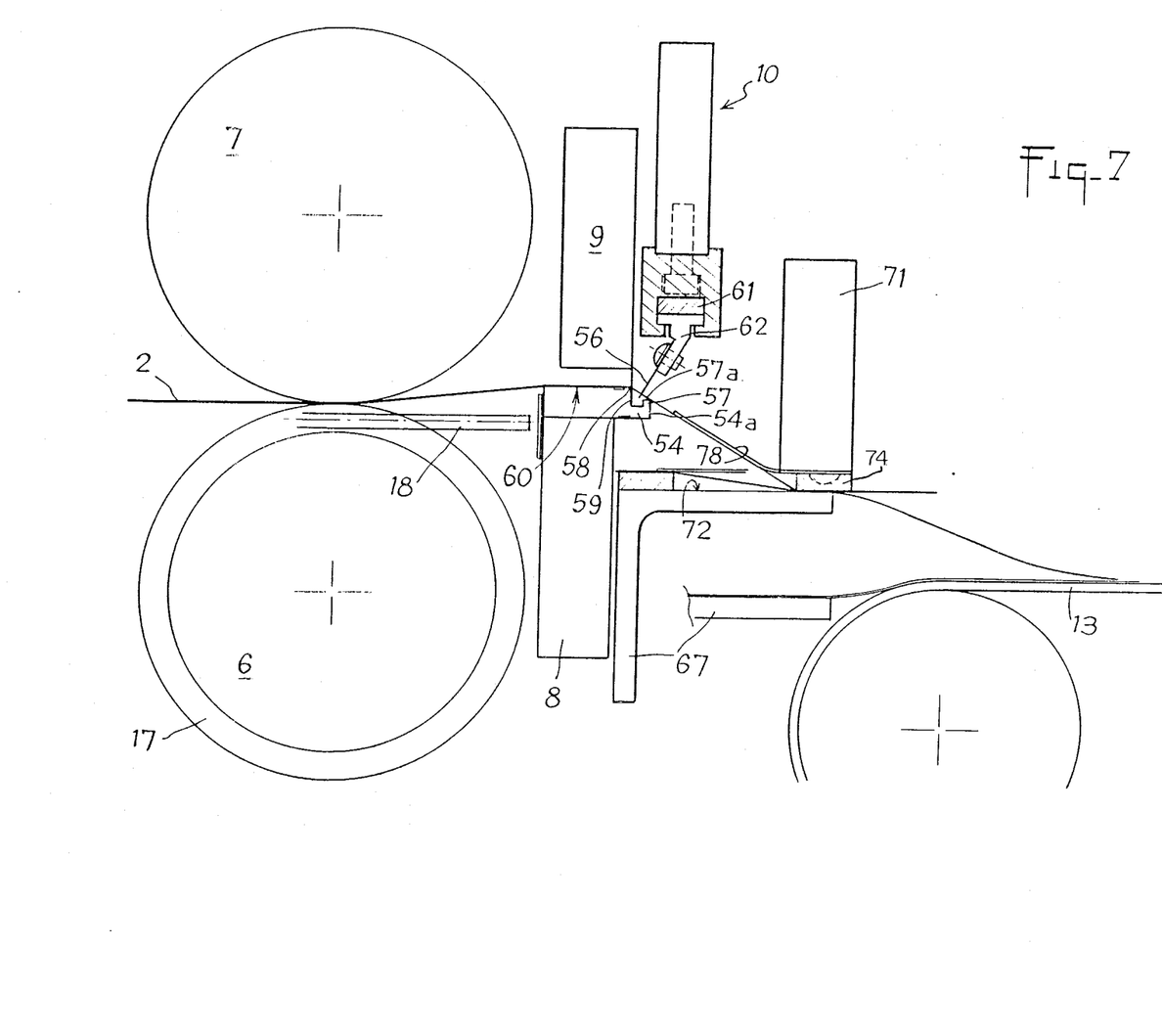

Cutting device means 10 is mounted in a fixed manner downstream and in the immediate vicinity of the stationary upper jaw 9, and comprises two splined pulleys (not shown) around which there runs a splined support belt 61 (FIG. 7) which has at least one oblique fixation tab 62 for cutting blade 56, the blade of which preferably is slanted by approximately 45 degrees and in a manner such as to find itself in a plane perpendicular to the support plane of the web 2, a support plane determined by the shifted upper edges 57a and 58 of transverse groove 55. One of the splined pulleys is continuously driven by an adjustable speed motor (not shown) which is synchronized with the displacements of the lower jaw 8, so that the cutting blade will begin its trajectory along the lower side of the splined belt 61 only when the lower jaw 8 is in the high position of welding (FIG. 7). The lower side of the splined belt 61 is guided in a guide 62 affixed to frame 1. The general design of the cutting device 10, moreover, is described in U.S. Pat. No. 4,230,029 to which reference may be made for more detail.

It must be noted that the lower jaw 8, immediately below the transverse groove 55, is provided with a certain number of apertures 63 for blowing air, which extend horizontally in the direction of passage of the tubular web 2 and which open on the frontal face 54a of the retaining shoulder 54. The blowing apertures 63 are connected to vertical feeding ducts 64 provided for inside the body of the lower jaw 8 and are connected to a source of air under pressure (not shown). Inside of those feeding ducts 64, there are provided open horizontal transverse ducts 65 connected to the atmosphere on the frontal vertical face 66 of the lower jaw 8 below the retaining shoulder 54. The transverse ducts 65 suck in hot outside air toward the blowing apertures 63 by means of a water-jet pump effect. These blowing apertures 63 serve to create a second sheet of support and transportation air immediately downstream from the lower jaw 8 above the stacking table 67 and below the tubular web 2. The second sheet of air is, preferably, permanently established.

Below and downstream from the retaining shoulder 54 of lower welding jaw 8, there is provided for a stacking device 11 comprising a stacking table 67 which is mounted vertically movable on vertical guides (not shown) and biased upwardly by a compression spring 68, for example until the rear or upstream end abuts against the lower face of the retaining shoulder 54 (FIGS. 1 and 5). Compression spring 68 has one end bearing against the lower face of the stacking table 67 and the opposite end bearing against an adjustable lug piece 69 fixed to frame 1. The upper face of the stacking table 67 below the retaining shoulder 54 is provided with an elastic cushion or pad 70, of rubber or elastomeric material for example, serving to dampen the contact shock between the table 67 and the shoulder 54 in the maximum raised position thereof.

The stacking device 11 further comprises a blocking shoe or second clamping means 71, (FIGS. 1, 5, 6 and 7) vertically movable and capable of coming to bear against the downstream end of the upper support face 72 of the stacking table 67 thus clamping a segment of the upstream end portion of the tubular web 2 against the table 67 with the remainder of the downstream end portion 12 of the tubular web freely resting on the stack of bags 14 already supported for its greatest part on an endless conveyor belt 13.

In a manner similar to that of the governing system of the vertical displacement of lower jaw 8, blocking shoe 71 (FIG. 2) is affixed at its lateral ends to the upper end of two vertical guiding and supporting rods 80, slidably mounted in the same guiding box 45 as the guiding rods 44 of the lower jaw 8. At their lower end, these support and guiding rods 80 are fitted with a small contact disc or roller 75 continuously contacting against the governing surface 76 of a fourth cam 77 which is fastened to the same driven shaft 48 as the third cam 47 which governs the ascent and the descent of lower jaw 8. Of course the two cams 47 and 77 have their governing surfaces 76 angularly shifted, so that the blocking shoe 71 has already gone down to its position of pressing (FIG. 6) against the stack 14 of bags and pressing against the downstream end portion 12 of the tubular web 2, the length of which has not yet been welded and cut, before the lower jaw 8 has risen to its high welding position (FIG. 7). Furthermore, the positions of these third and fourth cams 47, 77 are synchronized with those of the first and second cams 25 and 31, so that the tubular web 2 will be held at the level of braking roller 38 at the time of the moving away or of the upwardly pivoting of the upper transporting roller 7 and at the time of tightening of the end portion of the tubular web 2 by the blocking shoe 71.

The blocking shoe 71 is provided with a blade or sheet type spring or third clamping means 78 which extends in a rest or untaut position (FIGS. 5 and 6) horizontally upstream in the direction of jaws 7, 8 above the resilient pad 74. The free upstream end of the blade or sheet spring 78 comes in the rest position to place itself in the immediate vicinity of the vertical plane running through the frontal downstream face 54a of the retaining shoulder 54 of the lower jaw 8. At its downstream end, the blade type spring 78 is fixed between the lower face of the body of the blocking shoe 71 and its elastic cushion 74 which, preferably, has the same thickness as elastic cushion 70 of the stacking table 67. When the blocking shoe 71 occupies its upper position, the blade type spring 78 is in approximately the same plane as the lower face of upper fixed jaw 9.

When transporting rollers 6, 7 are tightened against each other and rotate in the direction of the arrows, they cause the tubular web 2 to move forward by a step of a given length, in the direction of the horizontal arrow. Since the lower roller 6 is continuously rotating, it is necessary to shift the upper roller 7 away and simultaneously clamping the tubular web at the location of the braking roller 38 of the intermittent stopping device or first clamping means 5, when it is desired to stop the forward motion of the tubular web material 2 at the end of a forward motion run. That operation is governed by cams 25 and 31 and also by means of the electro-magnet 35, as indicated above. From the time the forward motion of the tubular web 2 is stopped, the downstream end portion 12 of the latter is wedged or tightened against the stack of bags 14 or against the stacking table 67 by means of the blocking shoe or second clamping means 71 which to that end is brought to its lower tightening position (FIG. 6).

In that position, the length of tubular web which is located between the braking roller 38 and the blocking shoe 71 still is not stretched, since the descent of the latter only applies the tubular web 2 against the fore end and the rear cushion 70 of the stacking table 67.

It is starting with that position (FIG. 6) that the length of the tubular web is then slightly stretched by the ascent of the lower jaw 8 to its high welding position (FIG. 7) where the length of the tubular web which is located in front of the transverse groove 55 of the retaining shoulder 54 is stretched under the action of the blade or sheet spring or third clamping means 78 which has been shifted from its rest position and is in a tensioned flexed position. However, the tensioned flexed force of the spring 78 is small enough not to lengthen the tubular web and thus remains bent along an oblong plane passing through the support plane formed by the upper edges 57a and 58 of the transverse groove 55 until the welded bag segment is cut.

As soon as the cutting blade 56 starts the cutting of the flattened tubular web 2 along one of its edges, the cut made propagates along groove 55 also under the action of the force of the flexed sheet spring 78, which meets with less and less resistance and which finally folds back the rear end portion of the cut bag and clamps the formed bag to the stack of bags 14 which already are resting on table 67 or to the resilient pad 70 in the case of the first manufactured bag.

At that time, the lower jaw 8 descends to its low position in which it tightens, through its shoulder 54, the stack of bags 14 against the table 67 and the blocking shoe 71 moves back up and a new cycle of forward motion, of welding and of cutting of the tubular web 2 can start.

It must further be noted that the stacking table 67 has a maximum vertical run equal to the height of the stack of bags 14, and that the blocking shoe 71 occupies a unique lower position in which its blade or sheet spring 78 is at approximately the same level as the lower face of the retaining shoulder 54 of lower jaw 8 in its lowered position.

Although the best mode for carrying out the invention has been herein shown and described it will be apparent that a certain number of modifications or variations may be made without departing from the scope of the protection defined by the claims.

What is claimed is:

1. A machine for the manufacture and stacking of bags, pouches and the like made from a flattened sheath of a thermoplastic material, comprising:
   a frame;
   upper and lower sheath transporting rollers, the lower roller mounted in place to the frame and the upper roller mounted to one arm of a L-shaped rock arm pivotally mounted to the frame for vertically swinging the upper roller from the lower roller for intermittently advancing the sheath downstream by a predetermined bag length;
   means acting on a second arm of the L-shaped rock arm for intermittently swinging the one arm and upper roller;
   upper and lower welding jaws downstream of the rollers, the upper jaw mounted in place to the frame and the lower jaw slidably mounted to the frame for vertical movement to and from the upper jaw;
   means for intermittently moving the lower jaw in timed relation to the means acting on the second arm of the L-shaped rock arm for opening the jaws and advancing the sheath downstream of the jaws by the predetermined bag length and for closing the jaws on the advanced sheath and welding a closed bottom for a subsequent following sheath to be advanced;

a stacking table downstream and below the lower jaw for receiving the immediate advanced sheath;

a blocking shoe downstream and above the lower jaw slidably mounted to the frame for vertical movement to and from the stacking table, the blocking shoe having a depending resilient bar for pressing the immediate advanced sheath to the stacking table and a sheet spring member above the resilient bar extending horizontally toward the upper jaw in a raised position of the blocking shoe, in a lowered position of the blocking shoe the sheet spring member flexing upwardly and tensioning a segment of the immediate advanced sheath pressed against the stacking table extending downstream from the lower jaw to the resilient bar;

means for intermittently moving the blocking shoe in timed relation to the closing and opening of the jaws;

cutting means mounted in place to the frame between the upper jaw and the blocking shoe for cutting the immediate advanced sheath along the tensioned segment and forming an individual bag with an open top, the cutting means having a blade mounted at an angle to an intermittently driven endless belt;

a retaining shoulder on the lower jaw extending downstream toward the blocking shoe and having a transversely extending groove in a top side with a downstream edge stepped below an upstream edge for accommodating the angled blade in the raised position of the lower jaw;

means for intermittently driving the endless belt in timed relation to the raising of the lower jaw and the lowering of the blocking shoe for running the angled blade through the stepped edge groove and cutting the tensioned segment and forming an individual bag;

a resilient pad mounted to the stacking table below the shoulder on the lower jaw and extending downstream and outwardly therefrom for engaging the sheet spring member concurrent with the cutting of the tensioned segment and the unflexing of the sheet spring member in the lowered position of the blocking shoe; and a braking means upstream of the rollers having a countershoe mounted in place to the frame and a braking roller mounted above the countershoe to a lever pivotally mounted to the frame coaxial with the pivotal mounting of the L-shaped rock arm to the frame, the lever abutting the L-shaped rock arm and swingable thereby in one vertical direction for moving the braking roller out of contact with the sheath concurrent with the downward swinging of the upper rollers to the lower roller, and a spring means mounted at one end to the frame and engaging the lever arm at an opposite end for urging the braking roller toward the counter shoe upon disengagement of the lever arm from the rock arm.

2. The bag manufacturing and stacking machine according to claim 1, wherein the L-shaped rock arm is a rockable double rock arm lever pivotably mounted at an apex between the double arms to the frame, and wherein the lever arm of the braking roller is pivotably mounted at the apex to the double rock arm lever.

3. The bag manufacturing and stacking machine according to claim 2, wherein the shoulder is provided with a plurality of apertures for blowing air downstream from the lower jaw toward and above the stacking table.

4. The bag manufacturing and stacking machine according to claim 2, wherein the stacking table is moveable downwardly from a maximum raised position to a maximum lowered position equal to the height of a selected number of individual bags to be stacked under the shoulder on the resilient pad, and wherein the blocking shoe is moveable downwardly to a maximum lowered position less than the thickness of one individual bag on the stacking table when the stacking table is in a maximum raised position with the resilient pad contacting the shoulder on the lower jaw, and wherein the flexible spring sheet member in the maximum raised position of the stacking table tensioning a first segment of the pressed immediate sheath extending between the shoulder and the resilient pad and tensioning a second segment extending from the resilient pad to the resilient bar.

* * * * *